US012355200B2

(12) United States Patent
Schlipf

(10) Patent No.: US 12,355,200 B2
(45) Date of Patent: Jul. 8, 2025

(54) METHOD FOR PRODUCING AN ELECTRICAL FEEDTHROUGH AND ELECTRICAL FEEDTHROUGH

(71) Applicant: Türk & Hillinger GmbH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 177 days.

(21) Appl. No.: 17/970,387

(22) Filed: Oct. 20, 2022

(65) Prior Publication Data

US 2023/0138184 A1 May 4, 2023

(30) Foreign Application Priority Data

Nov. 3, 2021 (DE) ..................... 10 2021 128 644.1

(51) Int. Cl.

*H01R 4/56* (2006.01)
*H01R 4/02* (2006.01)
*H01R 43/02* (2006.01)
*H01R 43/16* (2006.01)

(52) U.S. Cl.

CPC ............. *H01R 43/16* (2013.01); *H01R 4/023* (2013.01); *H01R 4/024* (2013.01); *H01R 4/56* (2013.01); *H01R 43/0228* (2013.01)

(58) Field of Classification Search

CPC .................................. H01R 4/56; H01R 4/023
USPC ..................................................... 174/110 A
See application file for complete search history.

(56) References Cited

U.S. PATENT DOCUMENTS 3,613,231 A * 10/1971 Pugh ........................ H01B 7/29 174/15.6
8,109,787 B1 * 2/2012 Kun-Tse ................ H01R 24/20 439/578
2011/0189874 A1 * 8/2011 Weidner ................ H01R 24/50 439/157

(Continued)

FOREIGN PATENT DOCUMENTS

DE 10 2012 110 098 B4 3/2021

OTHER PUBLICATIONS

Office Action issued Jul. 8, 2022 in German Application No. 10 2021 128 644.1.

*Primary Examiner* — Chau N Nguyen
(74) *Attorney, Agent, or Firm* — Panitch Schwarze Belisario & Nadel LLP

(57) ABSTRACT

A method for producing an electrical feedthrough with an inner conductor arranged in some sections in a metallic outer pipe and electrically insulated from this outer pipe by an electrically insulating material. The inner conductor of the feedthrough has a contact section projecting out of the metallic outer pipe. The metallic outer pipe, the electrically insulating material, and the sections of the inner conductor, which are already arranged in the metallic outer pipe, are compressed with each other to form a module, in which the contact section projecting out of the metallic outer pipe is joined to the inner conductor only after completion of the compression of the metallic outer pipe, the electrically insulating material, and the sections of the inner conductor, which are already arranged in the metallic outer pipe. The contact section is positioned such that it is oriented along the center axis of the metallic outer pipe.

12 Claims, 4 Drawing Sheets

(56) References Cited

U.S. PATENT DOCUMENTS

| | | | | |
|---|---|---|---|---|
| 2013/0180752 | A1* | 7/2013 | Kodama | H01B 11/1882 174/107 |
| 2013/0199838 | A1* | 8/2013 | Brueck | F01N 3/01 174/650 |
| 2017/0317453 | A1* | 11/2017 | Tsau | H01R 24/38 |
| 2023/0092528 | A1* | 3/2023 | Perry | H01R 9/0515 439/578 |

* cited by examiner

METHOD FOR PRODUCING AN ELECTRICAL FEEDTHROUGH AND ELECTRICAL FEEDTHROUGH

CROSS-REFERENCE TO RELATED APPLICATIONS

This application claims priority under 35 U.S.C. § 119(b) to German Patent Application No. 10 2021 128 644.1, filed on Nov. 3, 2021, the disclosure of which is incorporated herein by reference in its entirety.

BACKGROUND OF THE INVENTION

Electrical feedthroughs are needed especially when an electrical conductor is to be routed through an electrically conductive material without forming an electrical contact between the electrical conductor and the electrically conductive material. They typically have an electrical conductor, an insulating material that has an electrically insulating effect, and a jacket by means of which the connection to the electrically conductive material, through which the conductor is to be routed, can be produced.

There is a line of applications, for example, in the automotive industry, in which such feedthroughs are exposed to very high loads. As an example, if one considers an electrical exhaust gas heating system for a catalytic converter in a motor vehicle, the power supply for the exhaust gas heating system must be routed in an insulated way through the wall of the pipe carrying the exhaust gas.

Such a catalytic converter heating system is often suspended in the exhaust gas pipe so that it is insulated from this pipe, which is realized partially by means of insulating pins in the interior of the exhaust gas pipe, but also at least partially by producing a mechanical connection of the electrical feedthrough conductor projecting into the interior of the pipe, especially through welding or soldering.

In addition, the electrical conductor of the feedthrough often has a thread on its connection side for securing an electrical contact of contact surfaces with a threaded connection. When this connection is tightened and loosened, significant torsion forces are also produced in addition to compression and tension.

In this use case, the electrical feedthrough must be able to withstand, on one hand, high long-term and continuous temperature loads, but also, on the other hand, high vibration loads, impacts, and mechanical shocks. Thus, it is very important that the electrical feedthrough has a high tensile strength and a high load-bearing capacity with respect to torsion.

For producing such electrical feedthroughs, it is known from the state of the art to provide the electrical conductor, which can consist of, for example, NiCr8020, as a semifinished part formed into the desired shape, for example, by turning, milling, and/or thread rolling, then to slide on an insulating pipe, which is typically made from a ceramic insulating material, in particular, from a porous MgO body made from, e.g., C820, and then to mount this arrangement in the interior of an outer pipe, which can consist, e.g., from stainless steel. After this arrangement made from electrical conductor, insulating pipe, and outer pipe is assembled, it is compressed to reduce its cross section, in particular, pressed, so that the electrical feedthrough is produced.

Another procedure known from German Patent No. DE 10 2012 110 098 B4 consists in that, for the electrical feedthrough, the inner conductor, insulating material, and outer pipe are provided as a compressed, preassembled bar stock material and from this bar stock material the exposed conductor sections of the inner jacket are machined as contacts and provided with the desired outer contours, for example, by cutting a thread into the inner conductor machined from the bar stock material.

Practice has shown that in both of the mentioned types of producing electrical feedthroughs, a significant problem emerges that is to be ultimately traced back to the fact that, for the compression or compaction, very high pressures must be processed to achieve the desired mechanical strength and low leakage rates, especially of exhaust gas through the electrically insulating material, while at the same time, the electrical insulating material itself, if it is used optionally as a molded body, is a porous starting material, whose porosity must be significantly reduced.

It has proven difficult to achieve an exact and process-reliable positioning of the inner conductor within the outer conductor after the compression. Both when compressing individual components to form the feedthrough and also when compressing the inner conductor, insulating material, and outer pipe to form the bar stock material, even if the inner conductor has been aligned exactly parallel and concentric to the outer pipe, which is not always the case in series production, after the compression, this same position and orientation of the inner conductor is no longer given, but there is a directional offset that can vary from one manufactured feedthrough to the next or one manufactured bar to the next. This offset can easily reach orders of magnitude of a few tenths of a millimeter to a few millimeters and means, in particular, that specifications for the minimum insulating distance can be met only if a design is selected that is large enough to ensure that the minimum insulating distance is always maintained even if an offset occurs.

BRIEF SUMMARY OF THE INVENTION

The task of the invention is therefore to provide an improved method for producing electrical feedthroughs and an improved electrical feedthrough, with which a precise position of the electrical contacts of the inner conductor can be ensured. This task is solved by a method with the features described herein and an electrical feedthrough with the features described herein. Advantageous refinements of the method or the electrical feedthrough are the subject matter of the present disclosure.

The method according to the invention is used for producing an electrical feedthrough with a single-part or multiple-part inner conductor arranged at least in some sections in a metallic outer pipe and electrically insulated from this outer pipe by an electrically insulating material.

As is typical for pipes, the outer pipe can be defined by a center axis, which defines its course, and a pipe cross section running perpendicular to the center axis. In principle, the direction of the center axis can vary over the length of the pipe (for example, if the pipe is bent into a siphon-like shape) and the pipe cross section can also vary over the length of the pipe (for example, if the pipe tapers). In typical feedthroughs, however, a tube with a cylindrical tube geometry is used, in which the tube cross section is circular or has a circular ring shape and the center axis is specified by a straight line running through the center points of the circles or circular rings. If the text is not clear, references to the center axis of the outer pipe mean the center axis of the pipe interior.

The inner conductor of the completed feedthrough has at least one contact section projecting out of the metallic outer pipe, which is used to electrically contact or connect the feedthrough. This contact section can be, for example, a connection end that is, in many cases, cylindrical and can be provided with an optional thread, a connection cone, or a connection pin, but, in principle, could also have other shapes.

In the method, the metallic outer pipe, the electrically insulating material, and the sections of the single-part or multiple-part inner conductor, which are arranged in the metallic outer pipe, are compressed or compacted with each other to form a module, for which purpose at least one pressing or compression step is required, which can be realized, in particular, by pressing, hammering, rolling, or kneading. Magnesium oxide has proven particularly useful as an electrically insulating material, which can be used as a molded body, as a powder, or as granulate and initially has a certain porosity that must be significantly reduced during compression in order to minimize any leakage rates, especially of exhaust gas, through the feedthrough. This requires high pressure, which leads to deformation of the outer pipe and the inner conductor, in particular, a reduction in diameter and elongation of the respective materials.

It is preferred for the invention that the at least one contact section projecting out of the metallic outer pipe is joined to the single-part or multiple-part inner conductor only after completing the compression of the metallic outer pipe, the electrically insulating material, and the sections of the single-part or multiple-part inner conductor, which are arranged in the metallic outer pipe, to form the module, wherein the contact section is positioned such that it is oriented along the center axis of the metallic outer pipe.

This procedure is based on the findings of the inventor that a compression or compaction process, which is required to form a compressed module made from an outer jacket, inner conductor, and electrically insulating material, produces a non-reproducible change in the position of the inner conductor within the outer jacket that varies from feedthrough to feedthrough. According to the preferred invention, by joining the contact section only after completing the compression or compaction process, it is guaranteed that this contact section is arranged exactly at the desired position relative to the outer jacket. Here, it must be noted that this precludes a press contact between the contact section and the inner conductor, because the contact section is then not joined after the completion of the compression or compaction process, so that unpredictable changes in position occur again when the press contact is formed.

According to a first embodiment of the method, before joining the contact section, but after completing the compression of the metallic outer pipe, the electrically insulating material, and the sections of the single-part or multiple-part inner conductor, which are arranged in the metallic outer pipe, to form the module, the position of the inner conductor relative to the outer pipe is determined and this determination is used for positioning the contact section. For this determination of position, it may be sufficient to determine the position of the inner conductor relative to the outer pipe on the two end sides, which can be used to determine an offset and/or tilting, which are by far the most common changes in position of the inner conductor during the compression or compaction process, in the cylindrical section of the inner conductor, which in most cases is essentially cylindrical and is arranged in the metallic outer pipe.

Alternatively or additionally, before joining the contact section, but after completing the compression of the metallic outer pipe, the electrically insulating material, and the sections of the single-part or multiple-part inner conductor, which are arranged in the metallic outer pipe, to form the module, the position of the center axis of the outer pipe can be determined and this determination can be used for positioning the contact section. This approach makes use of the fact that, in the usual case, the connection produced via the outer pipe to the wall, through which the electrical feedthrough passes, specifies the position and orientation of the feedthrough and thus represents a well-suited reference position for the placement of the contact section.

The contact section can be joined by machining it from a section of the single-part or multiple-part inner conductor. In particular, this is possible in that a single-part inner conductor can be achieved (because the contact section should by definition be part of the inner conductor), which can then be formed by a bar made from an electrically conductive material. The contact section can be machined in these bar materials, e.g., with cutting processes. It should be noted that these processes must be performed relative to a center axis, which deviates from the center axis of the inner conductor and, in particular, coincides with the center axis of the outer pipe, in order to enable the compensation of the position offset of the inner conductor, which is produced in the compression process to form the module. At the same time, this means that an inner conductor is used whose cross section is selected to be oversized so that it is possible to compensate for the maximum displacement that occurs in the compression or compaction process to form the module.

In particular, it is also possible that the section of the single-part or multiple-part inner conductor, from which the contact section is machined, is previously exposed by removing parts of the metallic outer pipe and the electrically insulating material, which have been compressed, i.e., a projection of the inner conductor is produced at a later stage.

Alternatively, the contact section can also be joined by connecting a separate section to the (multiple-part) inner conductor at the point where it is designed to be located. For this purpose, the contact section can be welded or soldered to an end side of a part of the single-part or multiple-part inner conductor arranged at least partially within the outer jacket.

It is also possible, however, that a section of the contact section is inserted into an opening, which can be produced, e.g., by drilling or turning, on an end side of a part of the single-part or multiple-part inner conductor arranged at least partially within the outer jacket and is welded or soldered there. In one refinement of this variant, a hole can be used that passes through the inner conductor without the contact section, in particular, the complete section of the inner conductor located within the outer pipe. The contact section can then be provided as a separate component with contacts on both ends and pushed into this hole. However, suitable measures such as welding or soldering must then be used to ensure that the feedthrough continues to have low leakage rates, especially of exhaust gas, for example, less than a few 10 ml/minute at 0.3 bar. This requirement also means that press contacting is practically impossible from a technical point of view, since the pressures to be used are so high that deformation or displacement of the inner conductor occurs and then the contact section would no longer be joined to the inner conductor only after the completion of the overall compression or compaction process to be performed.

The electrical feedthrough according to the preferred invention has a single-part or multiple-part inner conductor arranged at least in some sections in a metallic outer pipe and is electrically insulated from this outer pipe by an electrically insulating material. The inner conductor of the finished feedthrough has at least one contact section projecting out of the metallic outer pipe. The metallic outer pipe, the electrically insulating material, and the sections of the single-part or multiple-part inner conductor, which are arranged in the metallic outer pipe, are compressed or compacted with each other to form a module.

It is preferred that a center axis of the inner conductor runs offset relative to the center axis of the outer pipe and the contact section is offset relative to the center axis of the inner conductor and is arranged centered to the center axis of the outer pipe. This measure ensures that the contact section is positioned correctly in its desired position.

In a first variant, the contact section is machined out of a section of the single-part or multiple-part inner conductor, so that it is connected in one piece to this section of the inner conductor.

Alternatively, the contact section is a separate section that is soldered or welded to the rest of the inner conductor. In particular, a section of the contact section can be inserted into an opening on one end side of a part of the single-part or multiple-part inner conductor arranged at least partially within the outer jacket and can be welded or soldered there.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
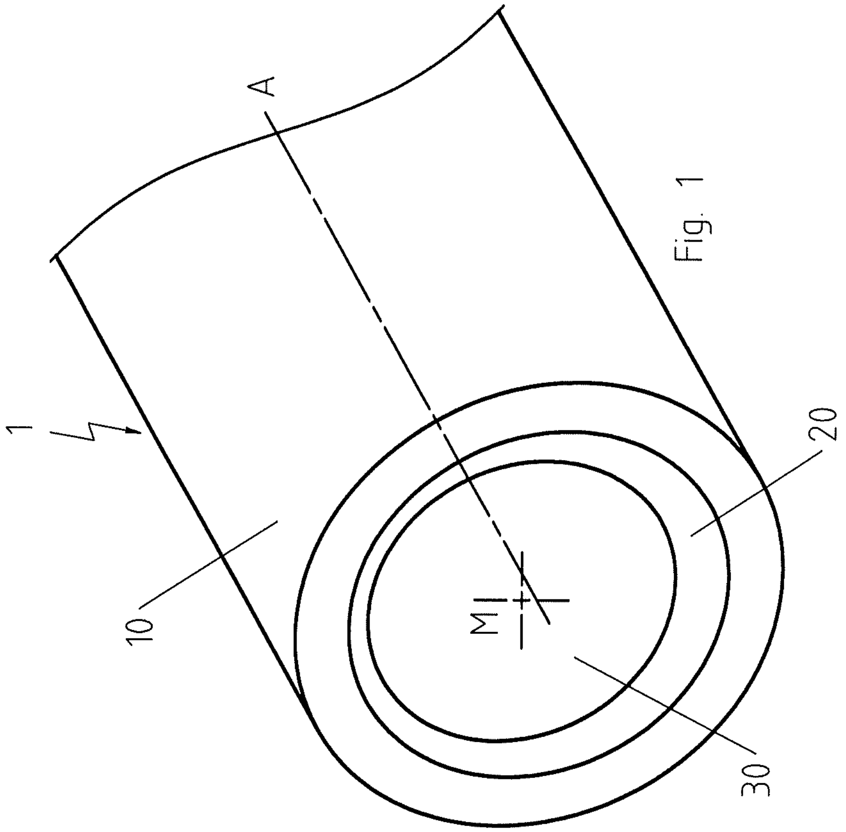
FIG. 1 is a perspective view of a portion of a compressed module produced in a first section of a method for producing an electrical feedthrough.

FIG. 1 shows a compressed module 1 with a metallic outer pipe 10, an electrically insulating material 20, and an inner conductor 30. As can be seen on closer inspection of FIG. 1, especially the end side facing the viewer, directly when comparing the indicated exit point M of the center axis of the inner conductor 30 with the position of the center axis A of the outer pipe 10, after the compression, the inner conductor 30 is not centered in the outer pipe 10, but offset or tilted relative to it. This can be caused, for example, by errors in the positioning of the inner conductor 30 in the outer pipe 10, such as a parallel offset or tilted orientation, even before the compression step or due to effects of inhomogeneities in the electrically insulating material 20 during the compression and is present in varying degrees of severity although regularly present—here the effect is shown significantly exaggerated. At the same time, the positional deviation of the inner conductor 30 from its ideal position can also be recognized from the fact that the layer of electrically insulating material 20 has different thicknesses in different radial directions.

Figure 2:
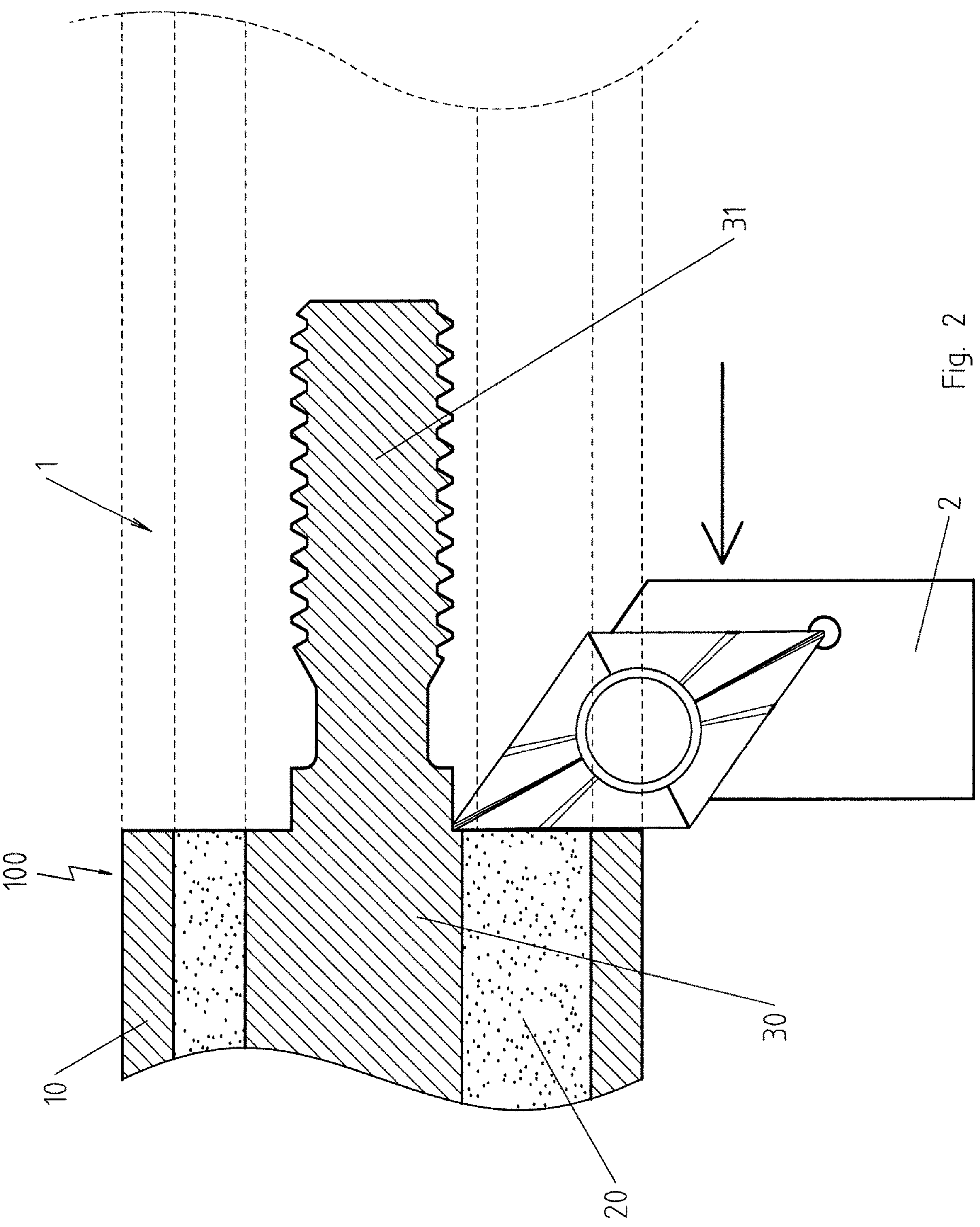
FIG. 2 is a cross-sectional view of a first variant of further processing of the module from FIG. 1 to form the electrical feedthrough.

FIG. 2 shows a longitudinal section through an end area of an electrical feedthrough 100 produced according to a first method from such a module 1 with outer jacket 10, electrically insulating material 20, which is here constructed as magnesium oxide granulate, and single-part inner conductor 30. The feedthrough 100 is produced from the completely compressed module 1 shown in FIG. 1 such that a contact section 31 is exposed by the removal of areas shown in FIG. 2 by dashed lines in the outer jacket 10, the electrically insulating material 20, and the inner conductor 30 with the tool 2. When looking at this contact section 31, it is immediately apparent that, unlike in the prior art, it is not centered relative to the cylindrical body of the inner conductor 30 arranged within the section of the outer pipe 10 that has not been removed, but instead relative to the outer pipe 10, so that despite the compression, the contact section 31 is arranged at the correct position and thus an exact contact can be made.

Figure 3:
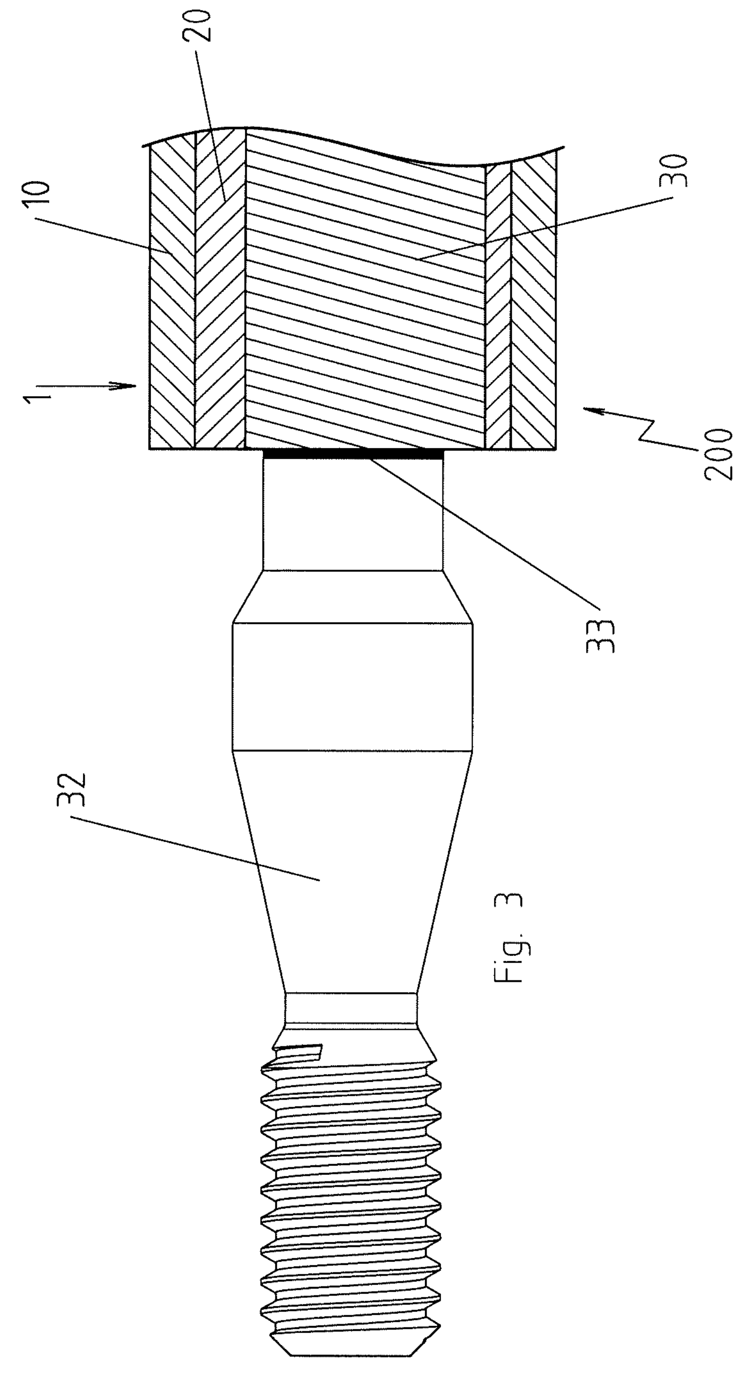
FIG. 3 is a side elevational, partial cross-sectional view of a second variant of further processing of the module from FIG. 1 to form the electrical feedthrough.

FIG. 3 shows a longitudinal section through an end area of an electrical feedthrough 200 produced according to a second method from such a module 1 with outer jacket 10, electrically insulating material 20, and multiple-part inner conductor 30, which is here formed by the inner conductor arranged within the outer pipe 10 and the separately produced contact section 32 connected to this outer pipe via the solder or weld contact 33. The feedthrough 200 is produced from the completely compressed module 1 shown in FIG. 1 such that a preassembled contact section 32 is soldered or welded on the end side to the section of the inner conductor arranged within the outer pipe 10.

When looking at this contact section 32, it is immediately apparent that, unlike in the prior art, it is not centered relative to the cylindrical body of the inner conductor arranged within the section of the outer pipe 10 that has not been removed, but instead relative to the outer pipe 10, so that, despite the compression, the contact section 32 is arranged at the correct position and thus an exact contact can be made.

Figure 4A:
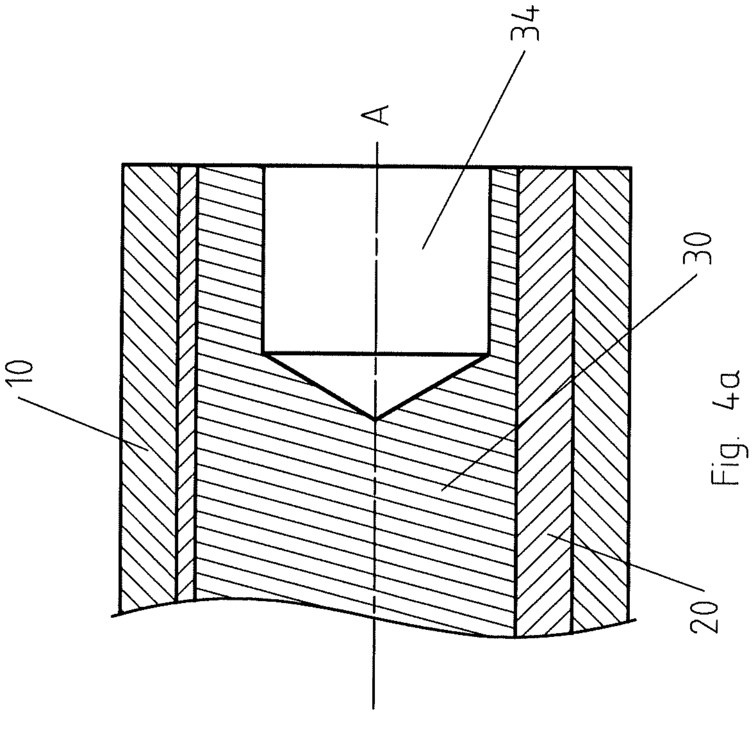
FIG. 4*a* is a longitudinal cross-sectional view through the module from FIG. 1 after a first step of a third variant of the further processing of the module to form the electrical feedthrough.
Figures 4B, 4C:
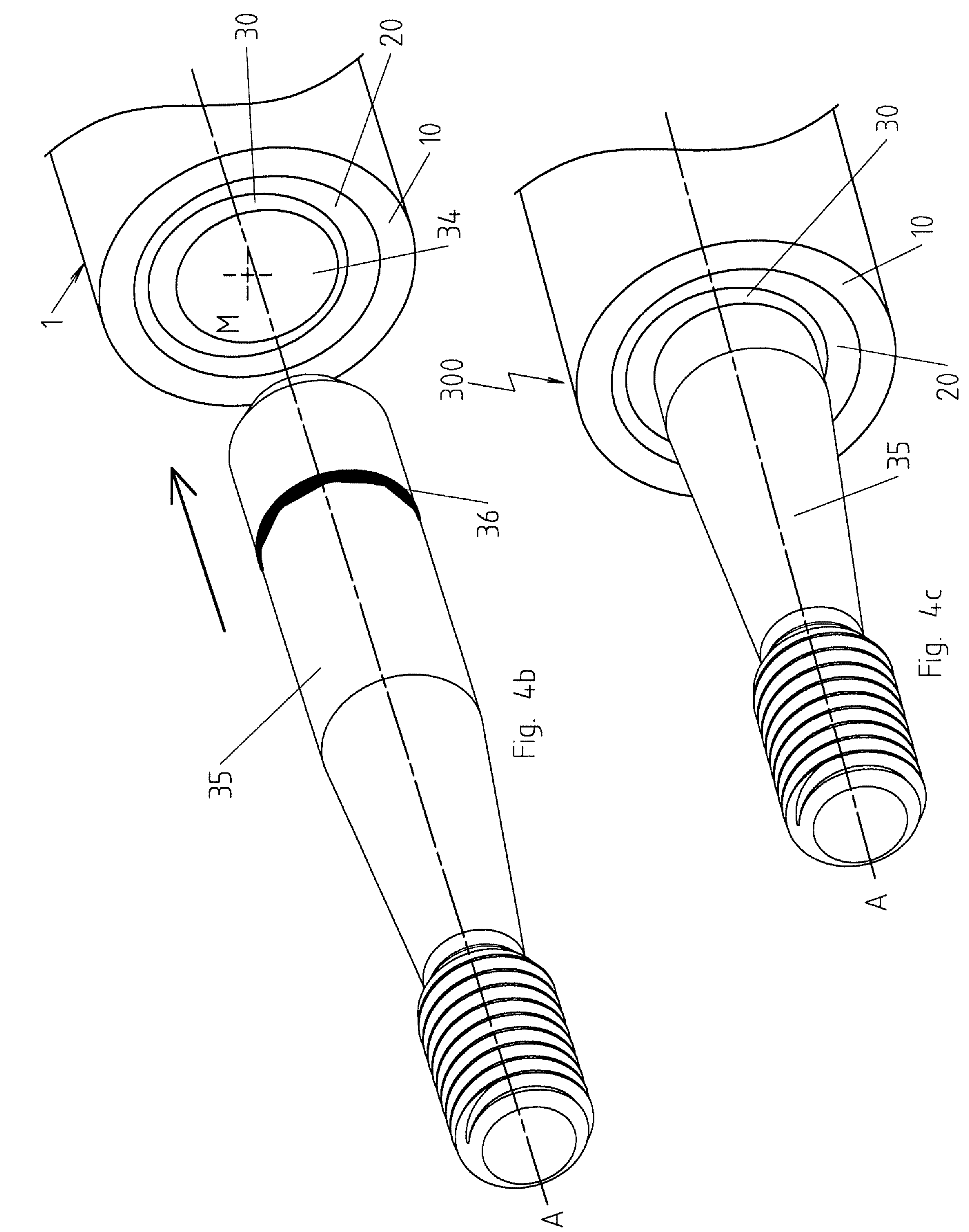
FIG. 4*b* is a side perspective view of a second step of the third variant of the further processing of the module to form the electrical feedthrough.
FIG. 4*c* is another side perspective view of a resulting embodiment of the electrical feedthrough.

FIGS. 4*a*-4*c* show different stages from different perspectives in the production of an electrical feedthrough 300, whose one end area is shown in FIG. 4*c*, according to a third method from such a module 1 with outer jacket 10, electrically insulating material 20, and multiple-part inner conductor 30, which is formed here by a section of the inner conductor 30 arranged completely within the outer pipe 10 and a separately produced contact section 35.

As shown in FIG. 4*a*, an opening 34 is formed in the section of the inner conductor 30 arranged completely within the outer pipe 10, and indeed not centered relative to the cylindrical body of the inner conductor 30 arranged within the section of the outer pipe 10 that has not been removed, but instead relative to the outer pipe 10. This can be realized, for example, by drilling.

A separately produced contact section 35, which has, in this embodiment, an annular groove, in which a solder ring 36 is arranged, is then inserted into the opening 34 and fastened there with solder from the solder ring 36 by soldering, so that a multiple-part inner conductor 30 is produced.

FIG. 4c then shows the electrical feedthrough 300 produced in this way with the multiple-part inner conductor 30 arranged at least in some sections in a metallic outer pipe 10 and electrically insulated from this outer pipe by an electrically insulating material 20, with the inner conductor having the contact section 35 projecting out of the metallic outer pipe 10, wherein the metallic outer pipe 10, the electrically insulating material 20, and the parts of the multiple-part inner conductor 30, which are arranged completely within the metallic outer pipe 10, are compressed with each other to form a module 1. It can be seen, in particular, that a center axis M of the inner conductor 30 is offset relative to the center axis A of the outer pipe 10 and/or has a tilted profile and that the contact section 35 is arranged offset relative to the center axis M of the inner conductor 30 and centered on the center axis A of the outer pipe 10, so that the contact section 35 is positioned precisely.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

1 Module
2 Tool
10 Outer pipe
20 Electrically insulating material
30 Inner conductor
31, 32, 35 Contact section
33 Solder or weld contact
34 Opening
36 Solder ring
100, 200, 300 Electrical feedthrough

The invention claimed is:

1. An electrical feedthrough with a single-part or multiple-part inner conductor arranged at least in some sections in a metallic outer pipe and electrically insulated from the metallic outer pipe by an electrically insulating material, wherein the inner conductor of the electrical feedthrough has a contact section projecting out of the metallic outer pipe, wherein the metallic outer pipe, the electrically insulating material, and sections of the single-part or multiple-part inner conductor, which are arranged completely in the metallic outer pipe, are compressed with each other to form a module, characterized in that a center axis of the inner conductor is offset relative to the center axis of the outer pipe and has a tilted profile and the contact section is offset relative to a center axis of the inner conductor and is arranged centered on the center axis of the outer pipe, the contact section is machined from a section of the single-part or multiple-part inner conductor, so that the inner conductor is a single piece with the contact section.

2. The electrical feedthrough according to claim 1, wherein the contact section is a separate section that is soldered or welded with the rest of the inner conductor.

3. An electrical feedthrough with a single-part or multiple-part inner conductor arranged at least in some sections in a metallic outer pipe and electrically insulated from the metallic outer pipe by an electrically insulating material, wherein the inner conductor of the electrical feedthrough has a contact section projecting out of the metallic outer pipe, wherein the metallic outer pipe, the electrically insulating material, and sections of the single-part or multiple-part inner conductor, which are arranged completely in the metallic outer pipe, are compressed with each other to form a module, characterized in that a center axis of the inner conductor is offset relative to the center axis of the outer pipe and has a tilted profile and the contact section is offset relative to a center axis of the inner conductor and is arranged centered on the center axis of the outer pipe, wherein a section of the contact section is inserted into an opening on an end side of a part of the single-part or multiple-part inner conductor arranged at least partially within the outer pipe and is welded or soldered to the single-part or multi-part inner conductor.

4. An electrical feedthrough for routing an electrical conductor through an electrically conductive material of a wall in an insulated way in a high long-term and continuous temperature load environment, the electrical feedthrough comprising:

- a metallic outer pipe defining a center axis, the metallic outer pipe configured for fixing to the wall;
- an inner conductor extending within the outer pipe along the center axis, the inner conductor defining a conductor center axis offset from the center axis;
- an electrically insulating material electrically insulating the metallic outer pipe from the inner conductor, the electrically insulating material spaced radially from the center axis between the metallic outer pipe and the inner conductor, the metallic outer pipe, the inner conductor and the electrically insulating material being compressed with each other to form a module; and
- a contact section fixed to the module at a contact, the contact positioned on the center axis such that the contact section is centered on the center axis, the contact located at an exposed end of the inner conductor.

5. The electrical feedthrough of claim 4, wherein the metallic outer pipe is configured for fixing to the wall by one of welding or soldering.

6. The electrical feedthrough of claim 5, wherein the wall is comprised of wall of an exhaust that carries exhaust gas of an automobile.

7. The electrical feedthrough of claim 4, wherein the electrically insulating material is comprised of magnesium oxide granulate.

8. The electrical feedthrough of claim 4, wherein the contact section is fixed to the module by one of a solder and a weld.

9. The electrical feedthrough of claim 4, wherein the contact section includes a base end and a connection end, the base end fixed to the contact and a threaded end spaced from the contact.

10. The electrical feedthrough of claim 4, wherein the inner conductor is comprised of one of a single-part and a multi-part and has a cylindrical section.

11. The electrical feedthrough of claim 4, wherein the contact section projects out of the exposed end of the module.

12. The electrical feedthrough of claim 4, wherein the inner conductor and the electrically insulating material are arranged completely in the metallic outer pipe.

* * * * *